United States Patent
Ariyoshi et al.

(10) Patent No.: US 7,773,528 B2
(45) Date of Patent: Aug. 10, 2010

(54) PACKET MEASURING SYSTEM, PACKET MEASURING PROGRAM, PROBE AND PACKET MEASURING METHOD

(75) Inventors: Hideki Ariyoshi, Kawasaki (JP); Kazuo Mizuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 11/964,006

(22) Filed: Dec. 24, 2007

(65) Prior Publication Data

US 2008/0159168 A1 Jul. 3, 2008

(30) Foreign Application Priority Data

Dec. 28, 2006 (JP) .............................. 2006-356787

(51) Int. Cl.
*H04L 12/26* (2006.01)
(52) U.S. Cl. ....................... 370/241; 370/252
(58) Field of Classification Search .................. None
See application file for complete search history.

(56) References Cited

U.S. PATENT DOCUMENTS

| 5,271,000 | A * | 12/1993 | Engbersen et al. | 370/244 |
| 6,252,891 | B1 * | 6/2001 | Perches | 370/503 |
| 2005/0249125 | A1 * | 11/2005 | Yoon et al. | 370/252 |
| 2007/0223454 | A1 * | 9/2007 | Kimura et al. | 370/352 |
| 2008/0159166 | A1 * | 7/2008 | Take et al. | 370/252 |

FOREIGN PATENT DOCUMENTS

JP 2002-271392 A 9/2002

* cited by examiner

*Primary Examiner*—Min Jung
(74) *Attorney, Agent, or Firm*—Myers Wolin, LLC

(57) ABSTRACT

A packet measuring system and method for sending and receiving a test packet between a plurality of probes located in networks of different protocols. The system includes a packet sending unit for embedding communication information used for a transmission quality measurement in a payload field of a test packet and sending the test packet to an opposite probe, and a packet extracting unit for receiving the test packet sent by the opposite probe and extracting the communication information from the payload field of the test packet.

11 Claims, 8 Drawing Sheets

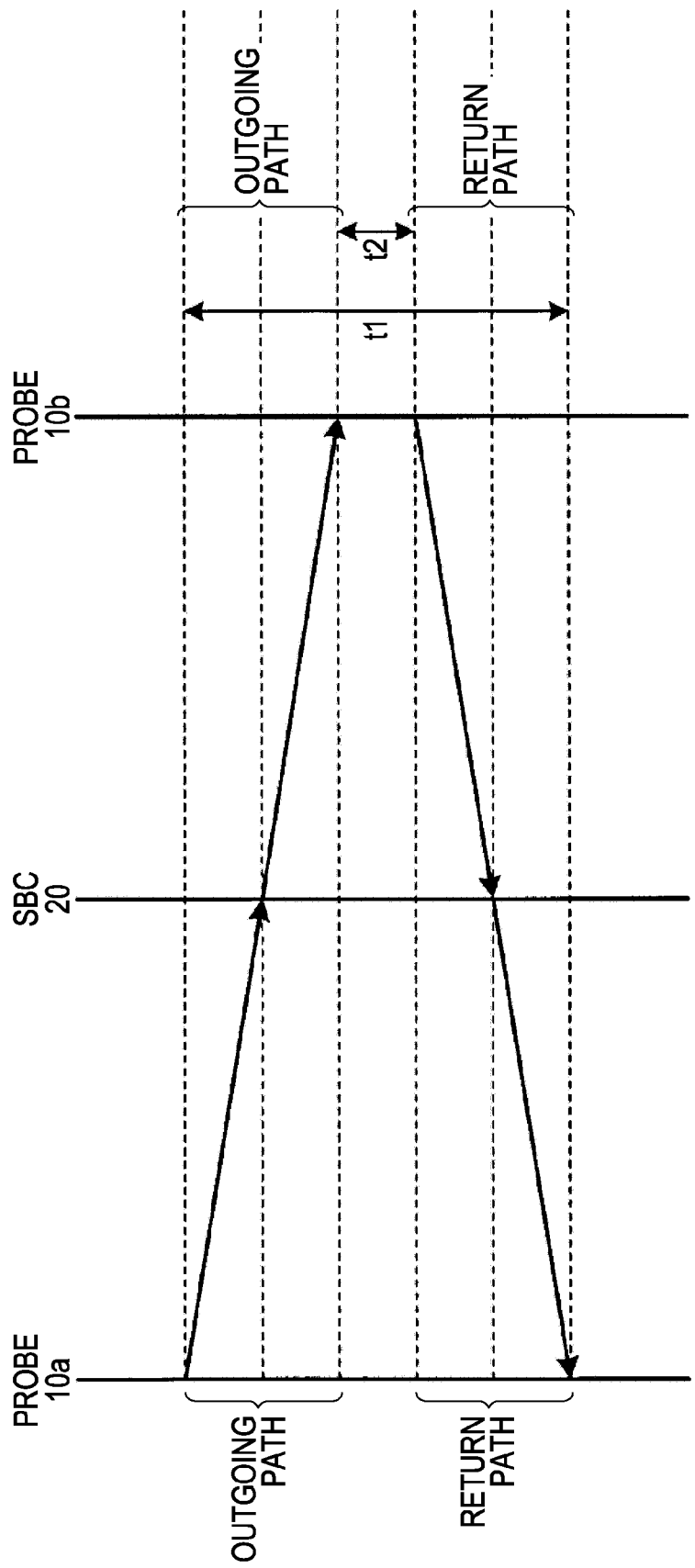

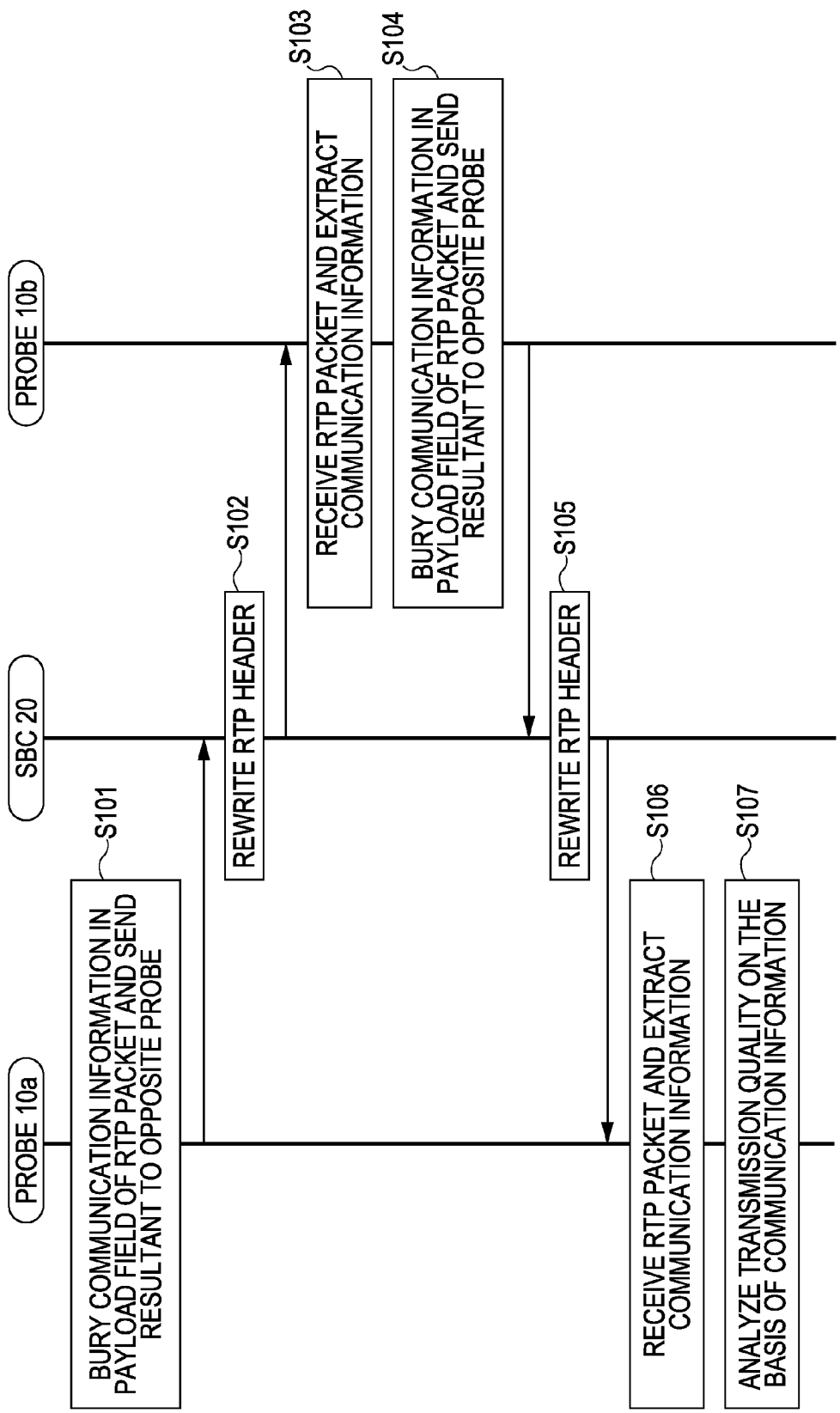

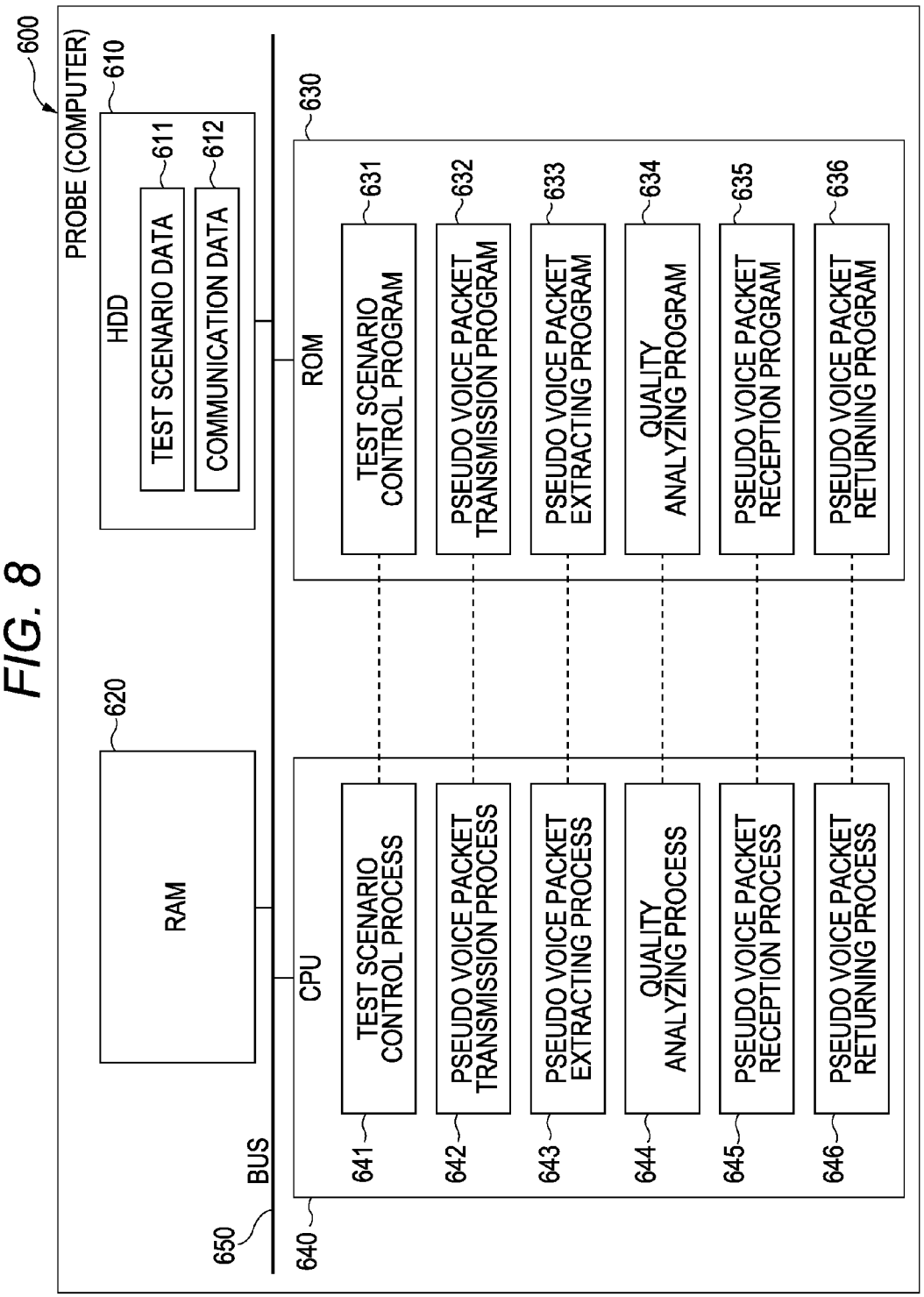

PACKET MEASURING SYSTEM, PACKET MEASURING PROGRAM, PROBE AND PACKET MEASURING METHOD

1. BACKGROUND

The present invention relates to a packet measuring system, packet measuring program, a probe, and a packet measuring method for sending and receiving a test packet between each of a plurality of probes located over networks of different protocols.

2. DESCRIPTION OF THE RELATED ART

An active measuring method for actively sending a test packet simulating a random service in order to measure the transmission quality (for example, packet loss rate and packet sending and receiving time) of a packet flowing in a network (for example, VoIP (voice over internet protocol)) has been used.

For example, JP-A-2002-271392 discloses one such active measuring method, in which a plurality of probes as a measuring devices (probes for example) are located at arbitrary measuring points, a test packet is sent and received between each of the plurality of probes, thereby measuring the transmission quality of the network based on a packet flowing in the network. To be more specific, a probe embeds communication information (for example, packet sending time and the sequence number of the packet) in the header of a test packet, sends the test packet to an opposite probe, and receives the test packet returned from the opposite probe, so as to measure the packet transmission quality.

However, there exist various VoIP network protocol formats, such as "ITU-T (International Telecommunication Union Telecommunication Standardization Sector) H. 323" and "SIP (Session Initiation Protocol)", and a plurality of probes may be located over networks of different protocols. In this case, the packet headers (for example, RTP (Realtime Transport Protocol) headers) are different for each protocol and thus, the probes may not properly send and receive the packets.

To cope with this, an SBC (Session Border Controller), to guarantee service quality, security, interoperability and the like of the VoIP service, is installed between the VoIP networks of different protocols. When receiving a packet, the SBC rewrites the header of the packet so as to be compliant with the protocol of a destination device, and then sends the packet to the destination device.

In the above-described technique, when the transmission quality of the packet is measured between the probes located over the networks of different protocols, the SBC rewrites the packet header (rewrites the "sequence number" or "sending time" as communication information contained in the header). Therefore, there has been an issue that proper communication information can not be sent and received between probes located over networks of different protocols.

Accordingly, the present invention addresses the above-mentioned issue and provides a technique for communication information to be sent and received between probes located over networks of different protocols.

3. SUMMARY

According to an aspect of an embodiment, a packet measuring system for sending and receiving a test packet between a plurality of probes located in the networks of different protocols includes a packet sending unit for embedding communication information used for transmission quality measurement in a payload field of a test packet and sending the test packet to an opposite probe, and a packet extracting unit for receiving the test packet sent by the opposite probe and extracting the communication information from the payload field of the test packet.

4. BRIEF DESCRIPTION OF THE DRAWINGS

FIG. 6 is an example diagram for explaining an analysis of the packet transmission quality;

FIG. 7 is a sequential diagram showing an example process flow of a process executed in the packet measuring system; and FIG. 8 is an example diagram showing a computer for executing a packet measuring program.

5. DETAILED DESCRIPTION OF THE EMBODIMENTS

In the following embodiment, a packet measuring system according to a first embodiment of the present invention will be described in the order of an outline and features of the packet measuring system, a configuration of a probe, and a process flow of a process in the packet measuring system. It is important to note that these embodiments are only examples of the many advantageous uses of the innovative teachings herein.

In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

Outline and Features of Packet Measuring System of Embodiment 1

Figure 1:
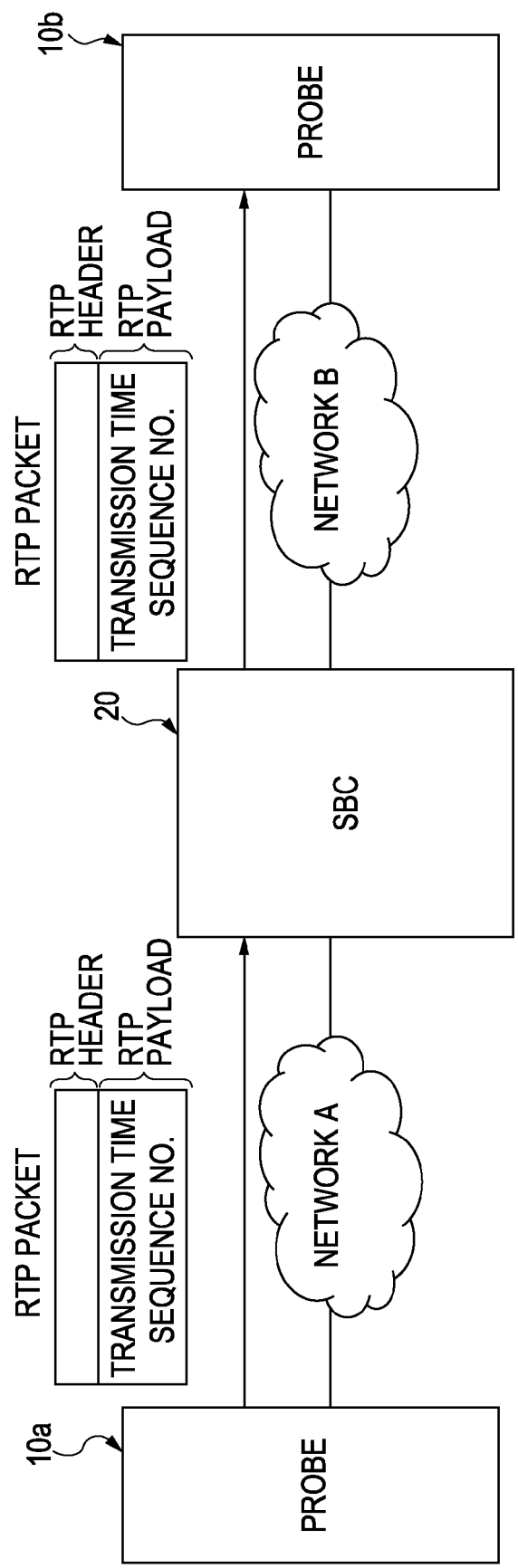
FIG. 1 is a example diagram for explaining an outline and features of a packet measuring system according to a first embodiment.

FIG. 1 is an example diagram for explaining an outline and features of a packet measuring system according to the first embodiment.

In the packet measuring system 1 of the embodiment 1, a test packet is sent and received between a plurality of probes 10, which are located over the networks of different protocols. A feature of the packet measuring system 1 is that proper communication information is sent and received between the probes located over the networks of different protocols.

As shown in FIG. 1, the packet measuring system 1 includes a probe 10a located in a network A, a probe 10b located in another network B of a protocol, which is different from that of network A, and an SBC 20 located between the networks A and B.

With such a configuration, the probe 10a of the packet measuring system 1 embeds communication information (a sending time and a sequence number as an example shown in FIG. 1), which is useful for the transmission quality measurement, in a payload field of an RTP packet as a test packet, and sends the resultant RTP packet to the opposite probe 10b by way of the SBC 20.

Then, the SBC 20 receives the RTP packet sent by the probe 10a, rewrites the RTP header of the packet, and then sends the RTP packet to the probe 10b. Subsequently, the probe 10b receives the RTP packet with the RTP header rewritten by the SBC 20, and extracts the communication information from the payload field of the test packet.

As described above, in the packet measuring system 1, the communication information is embedded in the payload field of the test packet. Accordingly, the communication information is not rewritten by the SBC 20. As a result, it is possible to send and receive communication information between the probes located in the networks of different protocols.

Configuration of a Probe

Figure 2:
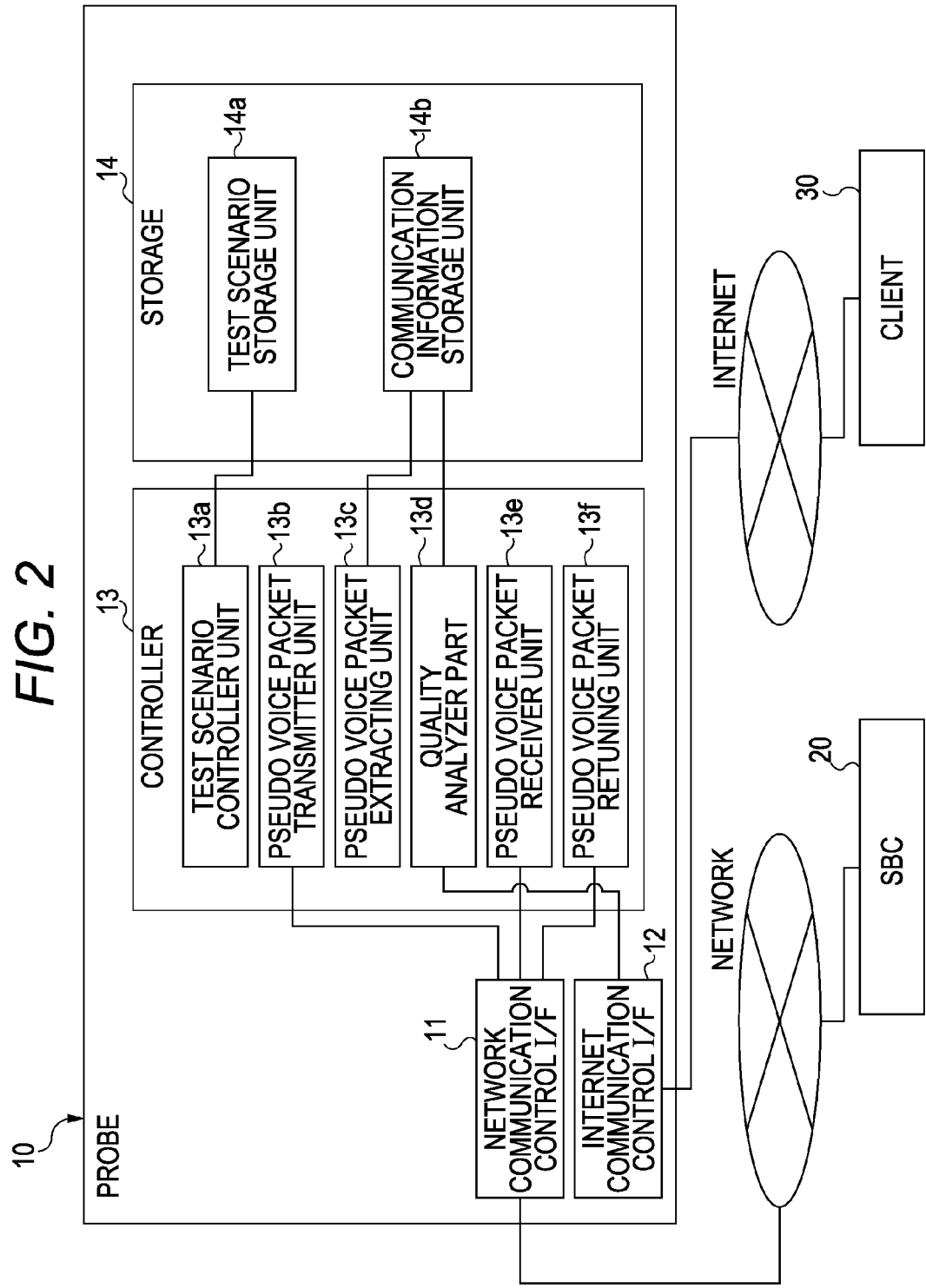
FIG. 2 is a block diagram showing a configuration of a probe.
Figure 3:
FIG. 3 is an example diagram for explaining a communication information storage unit.
Figure 4:
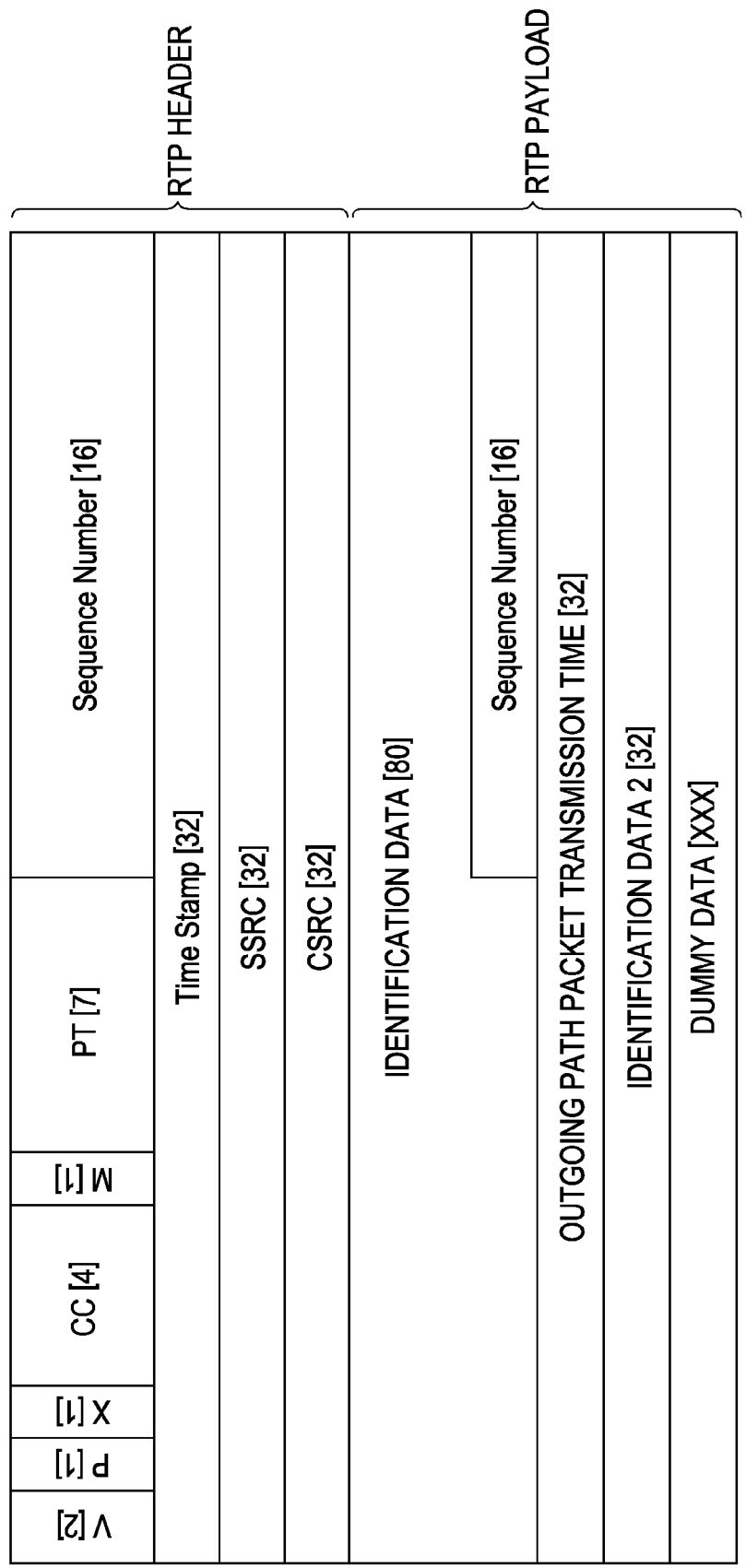
FIG. 4 is a diagram showing an example of an RTP packet for outgoing path test.
Figure 5:
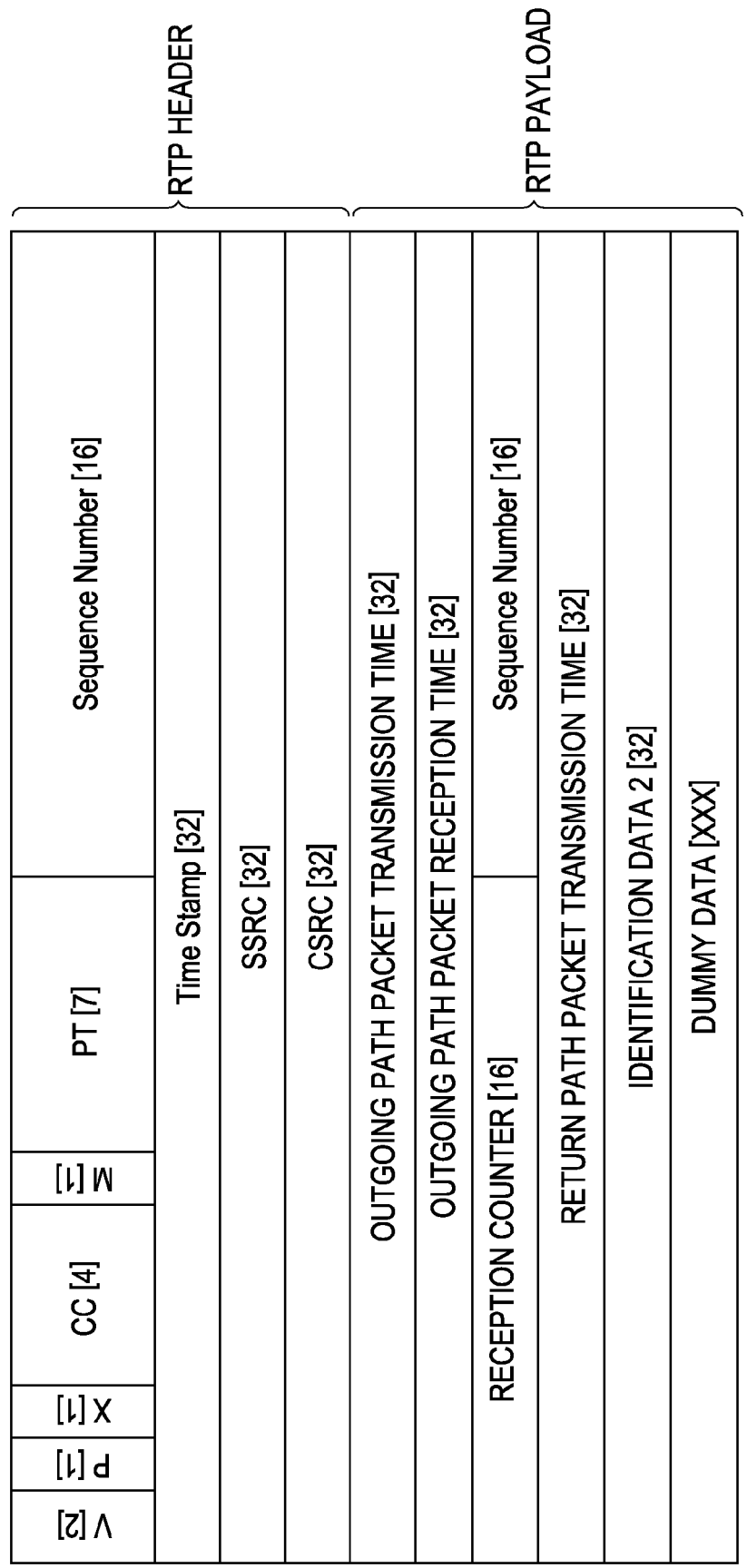
FIG. 5 is a diagram showing an example of an RTP packet for return path test.

A configuration of each probe 10 shown in FIG. 1 will be described with reference to FIGS. 2 to 6. FIG. 2 is a block diagram showing an example configuration of a probe. FIG. 3 is a diagram for explaining a communication information storage unit in the probe. FIG. 4 is a diagram showing an example of an RTP packet for outgoing path test. FIG. 5 is a diagram showing an example of an RTP packet for return path test. FIG. 6 is a diagram for explaining an analysis of the packet transmission quality.

As shown in FIG. 2, the probe 10 includes a network communication control I/F 11, an Internet communication control I/F 12, a controller 13, and a storage unit 14. The probe 10 is connected to the SBC 20 via a network, and connected to another probe (not shown) installed in a network of a different protocol, by way of the SBC 20. Further, the probe 10 is connected to a client 30 via the Internet. The processes of the respective units will be described.

The network communication control I/F 11 controls the communication concerning various information to be exchanged with another probe (not shown) connected thereto. Specifically, the network communication control I/F 11 sends and receives an RTP packet with the communication information embedded therein to and from another probe by way of the SBC 20.

The Internet communication control I/F 12 controls communication concerning various information to be exchanged with a client 30 connected thereto. Specifically, the Internet communication control I/F 12 sends a transmission quality of the packet, which is analyzed by a quality analyzing unit 13d to be described later, to the client 30.

The storage unit 14 stores data and programs, which are necessary for various processes to be executed by the controller 13. The storage unit includes a test scenario storage unit 14a and a communication information storage unit 14b, which are concerned with the present invention.

The test scenario storage unit 14a stores a scenario, for example the sequential flow of measuring the transmission quality of the packet. For example, the test scenario storage unit 14a stores, as a scenario, data containing measurement start time, IP address of a sending destination probe, port number for RTP packet reception, type of voice codec, sending interval of RTP packet, the number of sent RTP packets, and the like.

The communication information storage unit 14b stores communication information used for the transmission quality measurement. For example, the communication information storage unit 14b stores sequence number, sending time of outgoing path packet, receiving time of outgoing path packet, sending time of return path packet, and receiving time of return path packet.

The controller 13 includes an internal memory for storing programs defining various process procedures and necessary data and various processes are performed using the programs and data. The controller 13 includes a test scenario controller 13a, a pseudo voice packet sending unit 13b, a pseudo voice packet extracting unit 13c, a quality analyzing unit 13d, a pseudo voice packet receiving unit 13e, and a pseudo voice packet retuning unit 13f, which are concerned with the present invention. The pseudo voice packet sending unit 13b may be termed as a "packet sending unit," and the pseudo voice packet extracting unit 13c may be termed as a "packet extracting unit."

The test scenario controller 13a retrieves a scenario from the test scenario storage unit 14a, and issues a command for a specific process according to the retrieved scenario. For example, the test scenario controller 13a retrieves data including measurement start time, IP address of a sending destination probe, port number for RTP packet reception, type of voice codec, sending interval of RTP packets, the number of sent RTP packets, and the like as a scenario from the test scenario storage unit 14a and issues a command to the pseudo voice packet sending unit 13b to start the measurement of the transmission quality.

The pseudo voice packet sending unit 13b embeds communication information used for the transmission quality measurement in the payload field of the return path test RTP packet, which is a test packet, and sends the RTP packet to the opposite probe. Specifically, when receiving the command to start the transmission quality measurement from the test scenario controller 13a, the pseudo voice packet sending unit 13b embeds sending time of the outgoing packet and the sequence number in the RTP payload field of the outgoing path test RTP packet as shown in FIG. 4, and sends the resultant RTP packet to the opposite probe by way of the SBC 20.

The pseudo voice packet extracting unit 13c receives an RTP packet returned from the opposite probe, and extracts the communication information from the RTP payload field of the test packet. For example, the pseudo voice packet extracting unit 13c, extracts the sending time of outgoing path packet, reception time of outgoing path packet, sending time of return path packet, reception time of return path packet, and sequence number included in the received return path test RTP packet as shown in FIG. 5, and stores the extracted information into the communication information storage unit 14b.

The quality analyzing unit 13d analyzes the transmission quality of the packet by using the communication information extracted by the pseudo voice packet extracting unit 13c. For example, the quality analyzing unit 13d analyzes the transmission quality of the packet by using the sending time of the outgoing path packet, the reception time of the outgoing path packet, the sending time of the return path packet, and the reception time of the return path packet, which have been stored in the communication information storage unit 14b.

In a specific example, the quality analyzing unit 13d, computes time t1 from the sending time of the outgoing path packet as shown in FIG. 6 and the reception time of the outgoing path packet, computes time t2 from the sending time of the return path packet and the reception time of the return path packet at the source probe as shown in FIG. 6, and computes a round trip time of the packet by subtracting time t2 from time t1. Also the quality analyzing unit 13d computes the number of lost packets.

The pseudo voice packet receiving unit 13e receives the RTP packet from the opposite probe. Specifically, when receiving the RTP packet from the opposite probe, the pseudo voice packet receiving unit 13e extracts the IP address and the port number of the source probe, which has sent the RTP packet, and the sequence number of the RTP packet, and informs the pseudo voice packet returning unit 13f of the extracted information.

The pseudo voice packet retuning unit 13f returns the RTP packet to the source probe. To be more specific, the pseudo voice packet retuning unit 13f embeds the outgoing path reception time, the return path sending time, and the sequence number in the return path test RTP packet (FIG. 5). The pseudo voice packet retuning unit 13f sends the return path test RTP packet to the source probe using the IP address and the port number of the source probe, which are received from the pseudo voice packet receiving unit 13e.

Process by Packet Measuring System

FIG. 7 is a sequential diagram showing an example of a process flow of a process in the packet measuring system of the first embodiment.

As shown in the figure, when the probe 10a in the packet measuring system 1 starts a measurement of the transmission quality according to a scenario, the probe 10a embeds sending time of the outgoing path packet and the sequence number in the RTP payload field, and sends the resultant RTP packet to the opposite probe 10b by way of the SBC 20 (step S101). The SBC 20 receives the RTP packet from the probe 10a, rewrites the RTP header of the received packet, and sends the resultant packet to the probe 10b (step S102).

When receiving the RTP packet from the opposite probe, the probe 10b extracts the IP address and the port number of the source probe, which has sent the RTP packet, and the sequence number of the RTP packet from the received RTP packet (step S103).

Subsequently, the probe 10b embeds reception time of the outgoing path packet, sending time of the outgoing path packet, and the sequence number in the return path test RTP packet to be returned. The probe 10b returns the return path test RTP packet to the probe 10a as the source probe, through the SBC 20 using the IP address and the port number of the source probe 10a (step S104).

The SBC 20 receives the RTP packet from the probe 10b, rewrites the RTP header of the received packet, and sends the resultant packet to the probe 10a (step S105). The probe 10a receives the RTP packet, which has been returned from the opposite probe 10b, from the SBC 20, and extracts the reception time of the outgoing path packet, the sending time of outgoing path packet and the sequence number from the received RTP packet (step S106).

Probe 10a then analyzes the transmission quality of the packet using the sending time of outgoing path packet, the reception time of outgoing path packet, the sending time of the return path packet and the sequence number, which are extracted (step S107).

As described above, a probe embeds the communication information used for the transmission quality measurement in the RTP payload field of a test RTP packet, sends the resultant RTP packet to an opposite probe, receives the RTP packet sent by the opposite probe, and extracts the communication information from the RTP payload field of the RTP packet. Since the communication information is embedded in the RTP payload field, the communication information is not rewritten by the SBC 20. As a result, sending and receiving of the communication information between the probes located in the networks of different protocols is provided.

In the first embodiment, a probe embeds a sending time of a packet in the RTP payload field of a test packet, sends the resultant RTP packet to the opposite probe, receives the RTP packet sent by the opposite probe, and extracts the communication information from the RTP payload field of the RTP packet.

In the first embodiment, a probe embeds a sequence number for uniquely identifying an RTP packet in the RTP payload field of the RTP packet, sends the resultant RTP packet to the opposite probe, receives the RTP packet sent by the opposite probe, and extracts the sequence number from the RTP payload field of the RTP packet.

In the first embodiment, the transmission quality of the RTP packet is analyzed using the extracted communication information. Therefore, it is possible to analyze the transmission quality using the communication information.

Second Embodiment

While one specific embodiment of the invention has been described, the invention is not limited to the embodiment describe above, but may be implemented in other configurations. A second embodiment of the invention will be described hereunder.

(1) System Configuration, etc.

The respective components of each illustrated device are functionally and conceptually illustrated, and it is not necessary to configure those components as illustrated physically. That is, specific configuration of devices by distributing or integrating the components is not limited to the illustrated one. All or some of the components may be functionally or physically distributed and integrated in an arbitrary unit according to various loads and use conditions. For example, the test scenario controller 13a and the pseudo voice packet sending unit 13b may be integrated. All or an arbitrary part of the respective process functions executed by the respective devices may be realized by a CPU and a program that is analyzed and executed by the CPU or may be realized as a hardware using wired logics.

(2) Program

The various processes in the embodiment mentioned above may be realized by executing a previously provided program by a computer. Here, an example of a computer to execute a program having the same function as in the embodiment mentioned above will be described with reference to FIG. 8. FIG. 8 is a block diagram showing a computer for executing a packet measuring program.

As shown in FIG. 8, a computer 600 as a probe includes an HDD 610, a RAM 620, a ROM 630, and a CPU 640, which are interconnected by a bus 650.

The ROM 630 pre-stores a probe having the same function as in the embodiment, viz., a test scenario control program 631, a pseudo voice packet sending program 632, a pseudo voice packet extracting program 633, a quality analyzing program 634, a pseudo voice packet receiving program 635, and a pseudo voice packet returning program 636 (FIG. 8). The programs 631 to 636 may be appropriately integrated or distributed as the respective components of the probe 10 shown in FIG. 2

The CPU 640 reads those programs 631 to 636 from the ROM 630 and executes the programs. Thereby, the programs 631 to 636 respectively function as a test scenario control process 641, a pseudo voice packet sending process 642, a pseudo voice packet extracting process 643, a quality analyzing process 644, a pseudo voice packet receiving process 645, and a pseudo voice packet returning process 646, as shown in FIG. 8. Those processes 641 to 646, respectively correspond to the test scenario controller 13a, the pseudo voice packet sending unit 13b, the pseudo voice packet extracting unit 13c, the quality analyzing unit 13d, the pseudo voice packet receiving unit 13e, and the pseudo voice packet retuning unit 13f (FIG. 2).

Test scenario data 611 and communication data 612 are provided in the HDD 610, as shown in FIG. 8. The test scenario data 611 and the communication data 612 correspond to a test scenario storage unit 14a and a communication information storage unit 14b (FIG. 2). The CPU 640 registers data in the test scenario data 611 and the communication data 612, reads out data from the test scenario data 611 and the communication data 612, stores the read out data into the RAM 620, and executes processes using data stored in the RAM 620.

As can be seen from the foregoing description, the packet measuring system, the packet measuring programs, the probe and the packet measuring method are useful when test packets are sent and received between a plurality of probes located in the networks having different protocols and particularly suitable for sending and receiving communication information between probes located in the networks of different protocols.

What is claim is:

1. A packet measuring system comprising:
    a first probe comprising:
        a packet sending unit to embed communication information used for a transmission quality measurement in a payload field of a test packet and to send the test packet as a first protocol packet to a first network;
        a session border controller to rewrite a header of the test packet corresponding to the first protocol of the first network to a header corresponding to a second protocol, which is different from the first protocol, of a second network; and
    a second probe comprising;
        a packet extracting unit to receive the header rewritten test packet from the second network and to extract the communication information from the payload field of the header rewritten test packet.

2. The packet measuring system according to claim 1, wherein
    the packet sending unit embeds packet sending time into the payload field of the test packet and sends the test packet to the first network, and
    the packet extracting unit receives the header rewritten test packet and extracts the packet sending time from the payload field of the header rewritten test packet.

3. The packet measuring system according to claim 1, wherein
    the packet sending unit embeds a sequence number into the payload field of the test packet and sends the test packet to the first network, and
    the packet extracting unit receives the header rewritten test packet and extracts the sequence number from the payload field of the header rewritten test packet.

4. The packet measuring system according to claim 1, wherein the transmission quality is analyzed using the communication information extracted by the packet extracting unit.

5. A packet measuring program embodied in a computer-readable medium for causing a computer to perform a sending and receiving of a packet, the program, when executed, causing a computer to:
    embed communication information used for a transmission quality measurement in a payload field of a test packet and to send the test packet as a first protocol packet to a first network;
    rewrite a header of the test packet corresponding to the first protocol of the first network to a header corresponding to a second protocol, which is different from the first protocol, of a second network; and
    to receive the header rewritten test packet from the second network and to extract the communication information from the payload field of the header rewritten test packet.

6. The packet measuring program of claim 5, wherein the communication information includes at least one of a packet sending time and a sequence number.

7. A probe for sending and receiving a packet, the probe comprising:
    a packet sending unit to embed communication information used for a transmission quality measurement in a payload field of a test packet and to send the test packet as a first protocol packet to a first network;
    a session border controller to rewrite a header of the test packet corresponding to the first protocol of the first network to a header corresponding to a second protocol, which is different from the first protocol, of a second network; and
    a packet extracting units to receive the header rewritten test packet from the second network and to extract the communication information from the payload field of the header rewritten test packet.

8. The probe of claim 7, wherein the communication information includes at least one of a packet sending time and a sequence number.

9. A packet measuring method, comprising:
    embedding communication information used for a transmission quality measurement in a payload field of a test packet and sending the test packet as a first protocol packet to a first network;
    rewriting a header of the test packet corresponding to the first protocol of the first network to a header corresponding to a second protocol, which is different from the first protocol, of a second network; and
    receiving the header rewritten test packet from the second network and extracting the communication information from the payload field of the header rewritten test packet.

10. The method of claim 9, wherein the communication information includes at least one of a packet sending time and a sequence number.

11. The method of claim 9, further comprising:
    analyzing the transmission quality by using communication information extracted from the received header rewritten test packet.

* * * * *